(12) United States Patent
Rickettson (10) Patent No.: US 9,435,472 B2
(45) Date of Patent: Sep. 6, 2016

(54) COUPLER INCLUDING CLAMP FOR CONNECTION TO A CORRUGATED TUBE

(71) Applicant: MAHLE International GmbH, Stuttgart (DE)

(72) Inventor: Edward R. Rickettson, Holland, NY (US)

(73) Assignee: MAHLE International GmbH, Stuttgart (DE)

( * ) Notice: Subject to any disclaimer, the term of this patent is extended or adjusted under 35 U.S.C. 154(b) by 108 days.

(21) Appl. No.: 14/482,248

(22) Filed: Sep. 10, 2014

(65) Prior Publication Data

US 2015/0108752 A1 Apr. 23, 2015

Related U.S. Application Data

(60) Provisional application No. 61/892,122, filed on Oct. 17, 2013.

(51) Int. Cl.

| *F16L 37/096* | (2006.01) |
|---|---|
| *F16L 25/00* | (2006.01) |
| *F16L 33/22* | (2006.01) |
| *F16L 33/23* | (2006.01) |
| *B60H 1/32* | (2006.01) |

(52) U.S. Cl.
CPC ......... *F16L 25/0036* (2013.01); *B60H 1/3233* (2013.01); *F16L 25/0045* (2013.01); *F16L 33/221* (2013.01); *F16L 33/23* (2013.01)

(58) Field of Classification Search
CPC . F16L 37/096; F16L 37/098; F16L 37/0985; F16L 37/1205; F16L 37/127
See application file for complete search history.

(56) References Cited

U.S. PATENT DOCUMENTS

| 3,073,628 A * | 1/1963 | Cline ................... | F16L 33/221 285/243 |
|---|---|---|---|
| 3,250,551 A * | 5/1966 | Draudt ................ | F16L 37/0985 285/140.1 |
| 4,542,922 A * | 9/1985 | Grossauer ........... | F16L 25/0045 285/320 |
| 4,795,197 A * | 1/1989 | Kaminski ........... | F16L 25/0045 285/12 |
| 5,346,264 A | 9/1994 | Law et al. | |
| 5,799,989 A | 9/1998 | Albino | |
| 6,007,110 A | 12/1999 | Amatsutsu | |
| 6,634,678 B2 * | 10/2003 | Mariman ............ | F16L 37/0985 285/308 |
| 7,322,617 B2 | 1/2008 | Paquis | |
| 7,388,149 B2 | 6/2008 | Doherty et al. | |
| 7,581,564 B2 * | 9/2009 | Tanaka .................... | F16L 21/06 138/110 |
| 8,851,115 B2 * | 10/2014 | Kanno ................ | F16L 37/0985 137/614.04 |
| 2013/0147188 A1 | 6/2013 | Christian, Jr. et al. | |

FOREIGN PATENT DOCUMENTS

| DE | 19641358 A1 | 4/1998 |
| EP | 0086900 A1 | 8/1983 |
| WO | 01/20216 A1 | 3/2001 |

OTHER PUBLICATIONS

EP Search Report Dated Dec. 8, 2014.

\* cited by examiner

*Primary Examiner* — Rodney Mintz
*Assistant Examiner* — Daniel Kenny
(74) *Attorney, Agent, or Firm* — Brinks Gilson & Lione (57) ABSTRACT

A coupler configured to be attached to an end of a corrugated tube having a hollow shaft configured to be inserted within the corrugated tube and a flange surrounding at least a portion of the hollow shaft. The flange has a width larger than the inside diameter of the corrugated tube. A first and second arm is attached to the flange by flexible hinges. Each arm defines a clamp configured to engage an outer surface of at least one of the plurality of corrugations when the arm pivots about the flexible hinge. Each clamp may include a locking feature configured to lock the clamp to the first arm to the second arm and the clamp of the second arm to the first arm.

6 Claims, 7 Drawing Sheets

COUPLER INCLUDING CLAMP FOR CONNECTION TO A CORRUGATED TUBE

CROSS-REFERENCE TO RELATED APPLICATION

This application claims the benefit under 35 U.S.C. 119(e) of U.S. Provisional Patent Application No. 61/892,122 filed Oct. 17, 2013, the entire disclosure of which is hereby incorporated herein by reference.

TECHNICAL FIELD OF THE INVENTION

The invention generally relates to a coupler having a clamp configured to an end of a corrugated tube.

BACKGROUND OF THE INVENTION

Heating, ventilation, and air conditioning (HVAC) systems located inside the passenger compartment of a motor vehicle require a means to drain water that condenses on the evaporator core of the air conditioner. This is typically accomplished by a drain tube connected to the case containing the evaporator core that carries the condensate outside of the passenger compartment. This drain tube must seal to the case and to the vehicle body to prevent leakage of the condensate into the passenger compartment. It must also be flexible to allow for dimensional variation between the case and the vehicle drain hole.

Existing evaporator drain assemblies include a molded plastic coupler and a molded rubber tube that is configured to be joined to the evaporator case with a metal spring clamp. This design meets performance requirements but is costly to produce. The spring clamp tension also makes it difficult to assemble and service.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with one embodiment of this invention, a coupler configured to be attached to an end of a corrugated tube having an inside diameter and a plurality of corrugations of alternating smaller outside diameter and larger outside diameter is provided. The coupler includes a hollow shaft that is configured to be inserted within the corrugated tube and a flange surrounding at least a portion of the hollow shaft. The flange has a width larger than the inside diameter of the corrugated tube. The coupler further includes a first arm that is attached to the flange by a first flexible hinge. The first arm defines a first clamp that is configured to engage an outer surface of at least one of the plurality of corrugations when the first arm pivots about the first flexible hinge. The coupler also includes a second arm that is attached to the flange at a location opposite the first arm by a second flexible hinge. The second arm defines a second clamp that is configured to engage the outer surface of at least one of the plurality of corrugations when the second arm pivots about the second flexible hinge. The first clamp may include a first locking feature configured to lock the first clamp to the second arm and the second clamp may include a second locking feature configured to lock the second clamp to the first arm. The coupler may further include a fitting disposed on a distal end of the hollow shaft. The fitting is in fluid communication with the hollow shaft.

In accordance with another embodiment of this invention, a tube assembly is provided. The tube assembly includes a corrugated tube having an inside diameter and a plurality of corrugations having an alternating smaller outside diameter and larger outside diameter and a coupler as described above inserted within the corrugated tube. The coupler is secured to the corrugated tube by the engagement of the first and second clamps with an outer surface of at least one of the plurality of corrugations.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

A coupler designed to attach a corrugated tube is presented herein. The coupler has a hollow shaft or tube that fits within the inner diameter for the corrugated tube and a pair of arms with flexible hinges. The arms engage the corrugations of the tube and lock to one another to secure the coupler to the corrugated tube. The coupler may also include a fitting attached to one end of the hollow shaft. The fitting may be used to attach the coupler to another device, for example an air conditioning evaporator in order to drain condensate from the evaporator through the corrugated tube.

Figure 1:
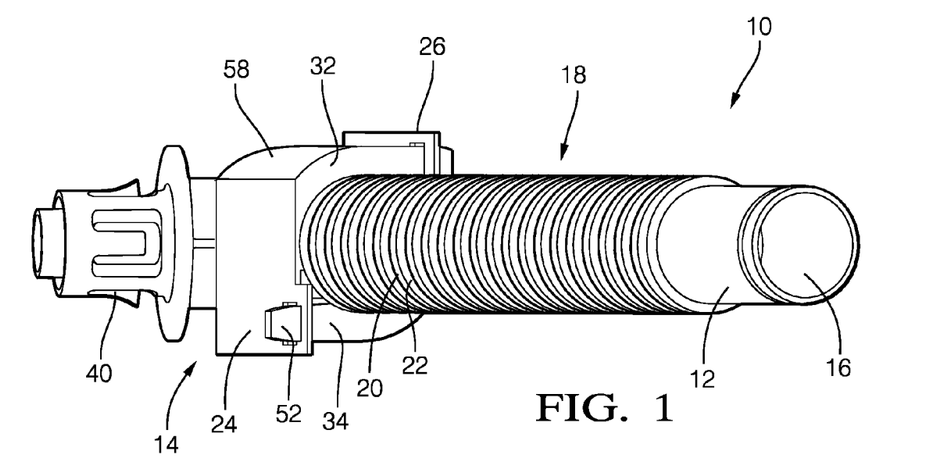
FIG. 1 is a perspective view of a coupler attached to a corrugated tube in accordance with one embodiment.
Figure 2:
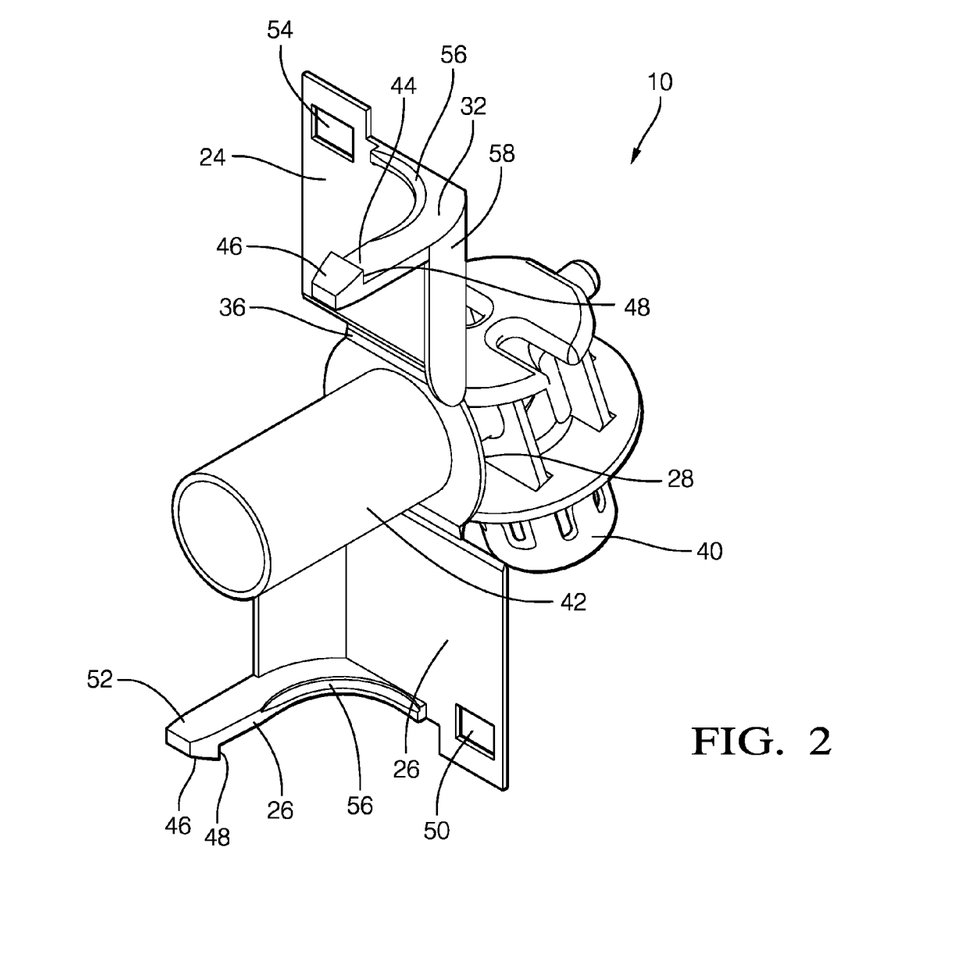
FIG. 2 is a perspective view of the coupler of FIG. 1 with first and second arms fully open in accordance with one embodiment.
Figure 3:
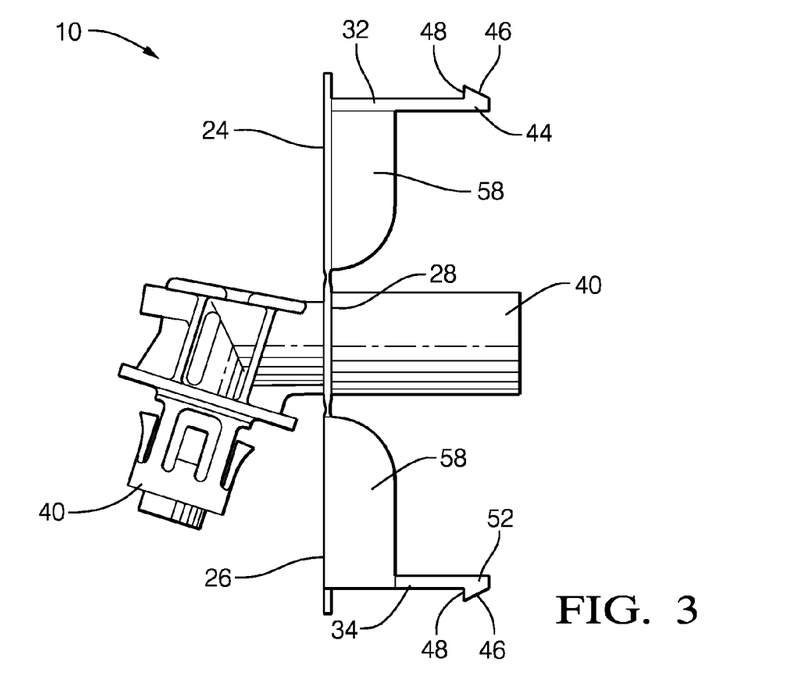
FIG. 3 is a side plan view of the coupler of FIG. 1 with the first and second arms fully open in accordance with one embodiment.
Figure 4:
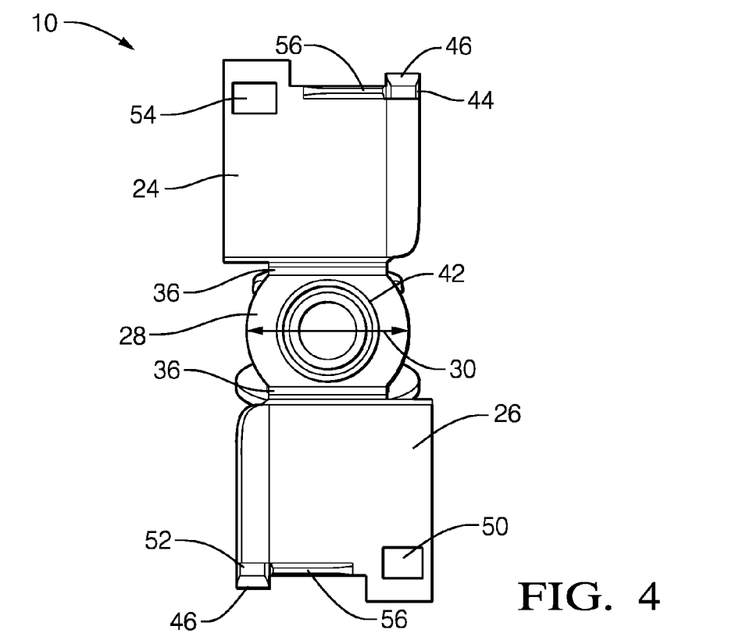
FIG. 4 is a front plan view of the coupler of FIG. 1 with the first and second arms fully open in accordance with one embodiment.
Figure 5:
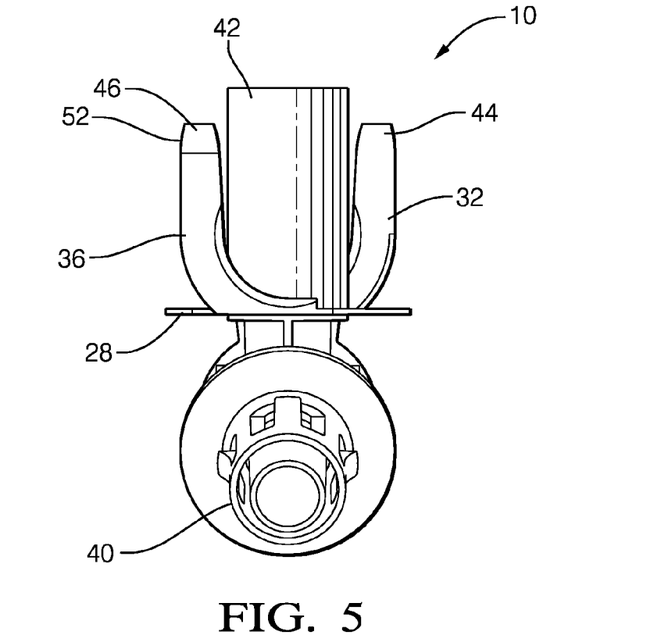
FIG. 5 is a top plan view of the coupler of FIG. 1 with the first and second arms fully open in accordance with one embodiment.
Figure 6:
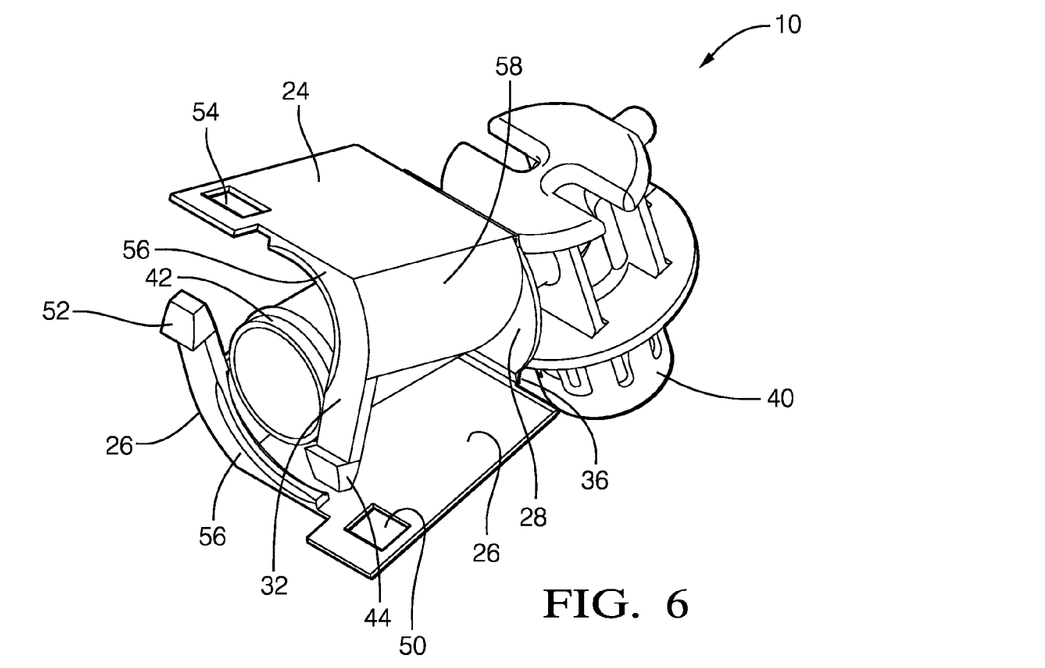
FIG. 6 is a perspective view of the coupler of FIG. 1 with the first and second arms partially closed in accordance with one embodiment.
Figure 7:
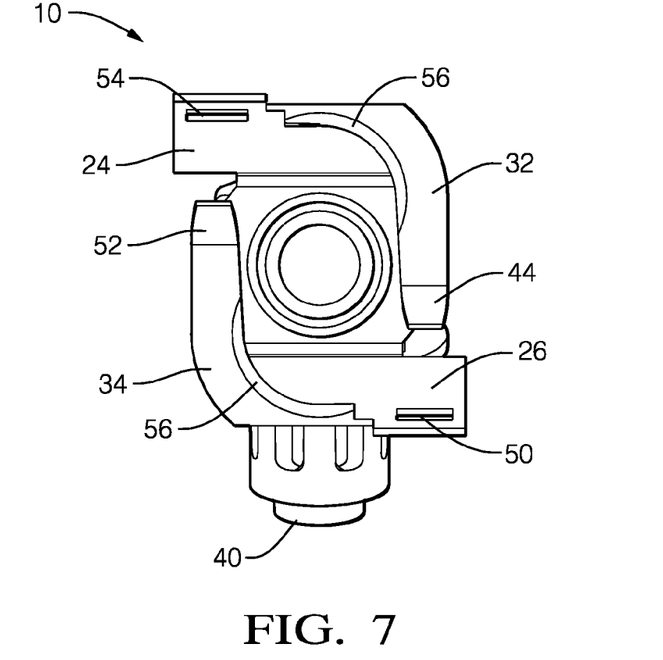
FIG. 7 is a side plan view of the coupler of FIG. 1 with the first and second arms partially closed in accordance with one embodiment.
Figure 8:
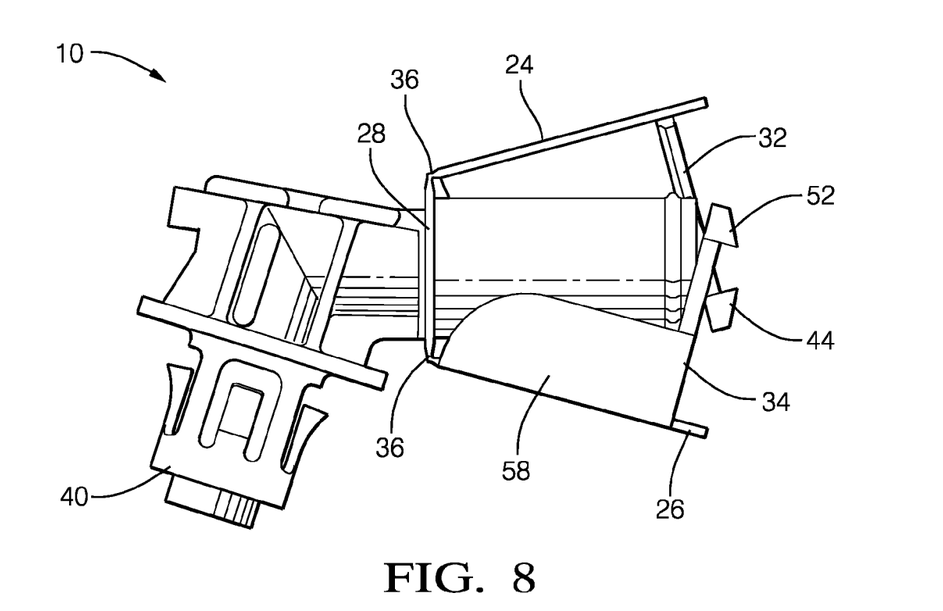
FIG. 8 is a front plan view of the coupler of FIG. 1 with the first and second arms partially closed in accordance with one embodiment.
Figure 9:
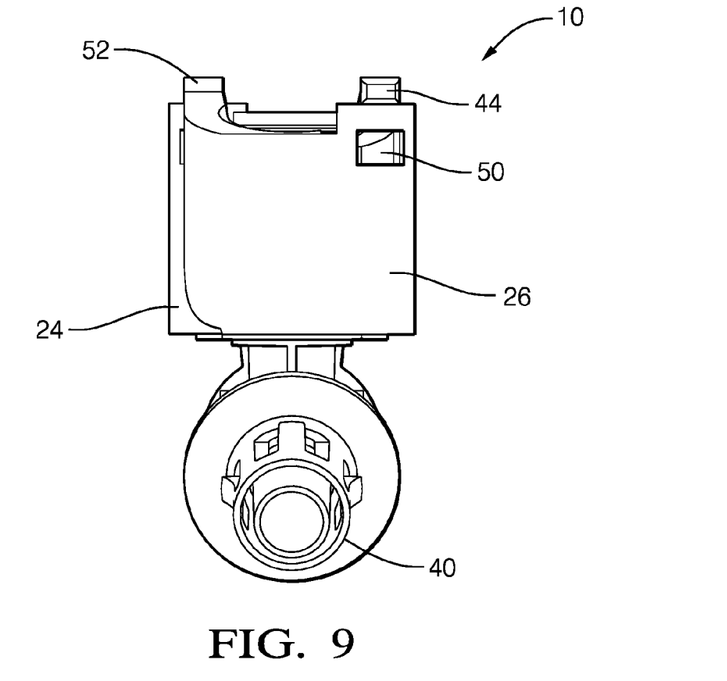
FIG. 9 is a top plan view of the coupler of FIG. 1 with the first and second arms partially closed in accordance with one embodiment.
Figure 10:
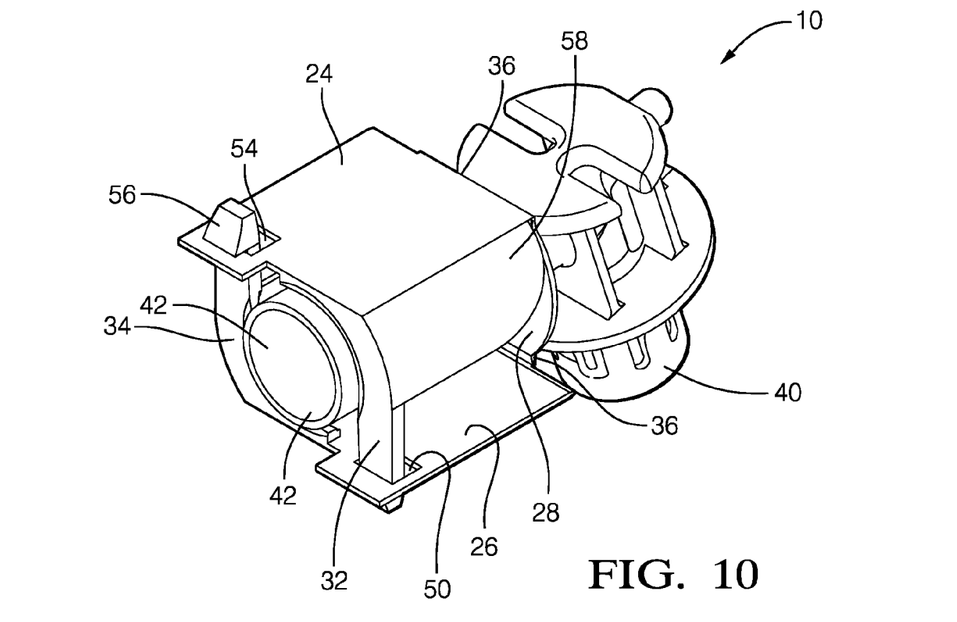
FIG. 10 is a perspective view of the coupler of FIG. 1 with the first and second arms fully closed and first and second clamps engaging a corrugation of the corrugated tube in accordance with one embodiment.
Figure 11:
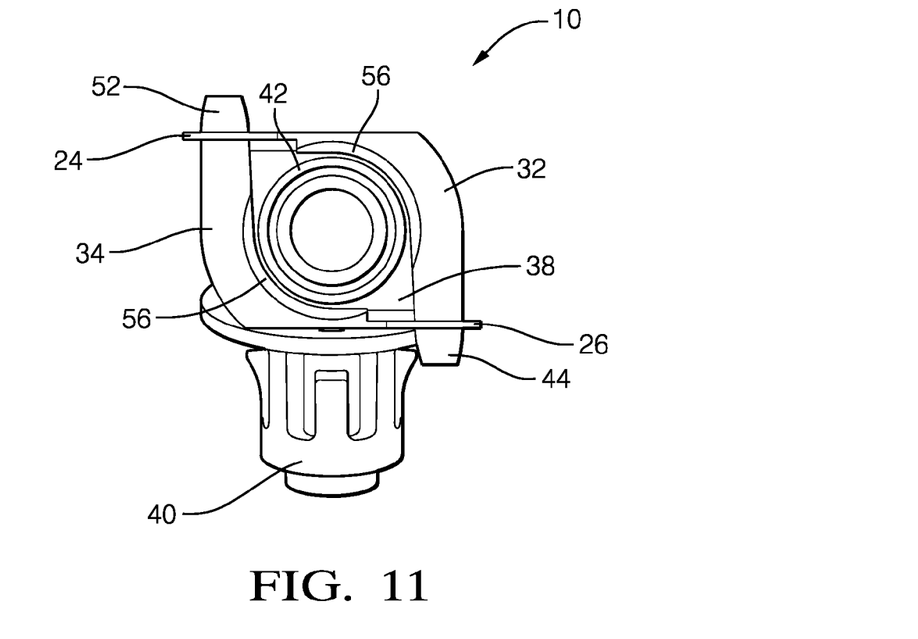
FIG. 11 is a side plan view of the coupler of FIG. 1 with the first and second arms fully closed and the first and second clamps engaging a corrugation of the corrugated tube in accordance with one embodiment.
Figure 12:
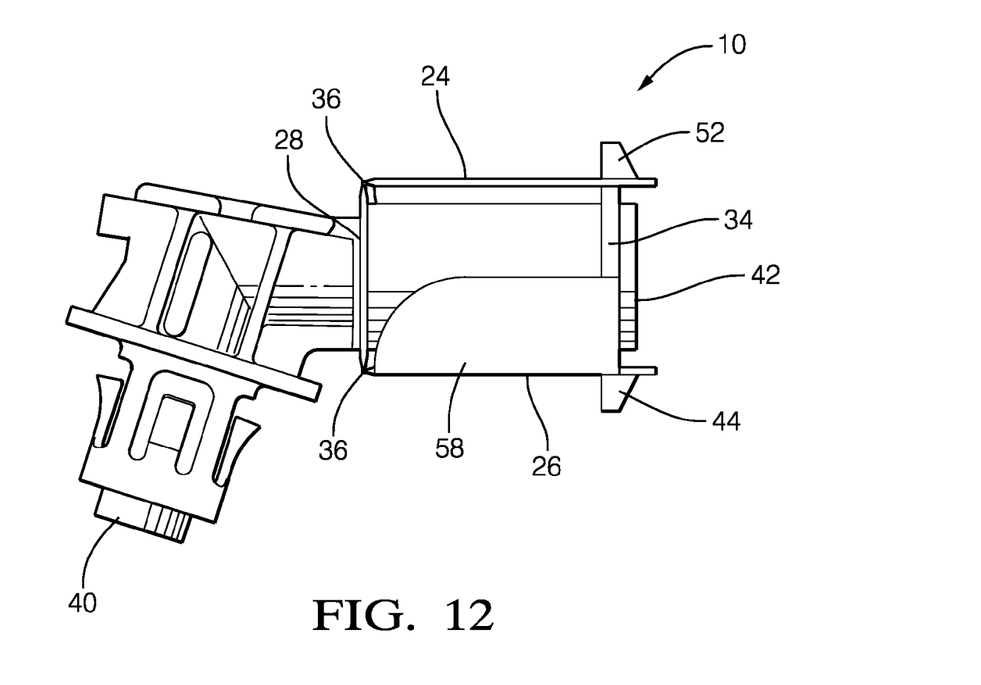
FIG. 12 is a front plan view of the coupler of FIG. 1 with the first and second arms fully closed and the first and second clamps engaging a corrugation of the corrugated tube in accordance with one embodiment.
Figure 13:
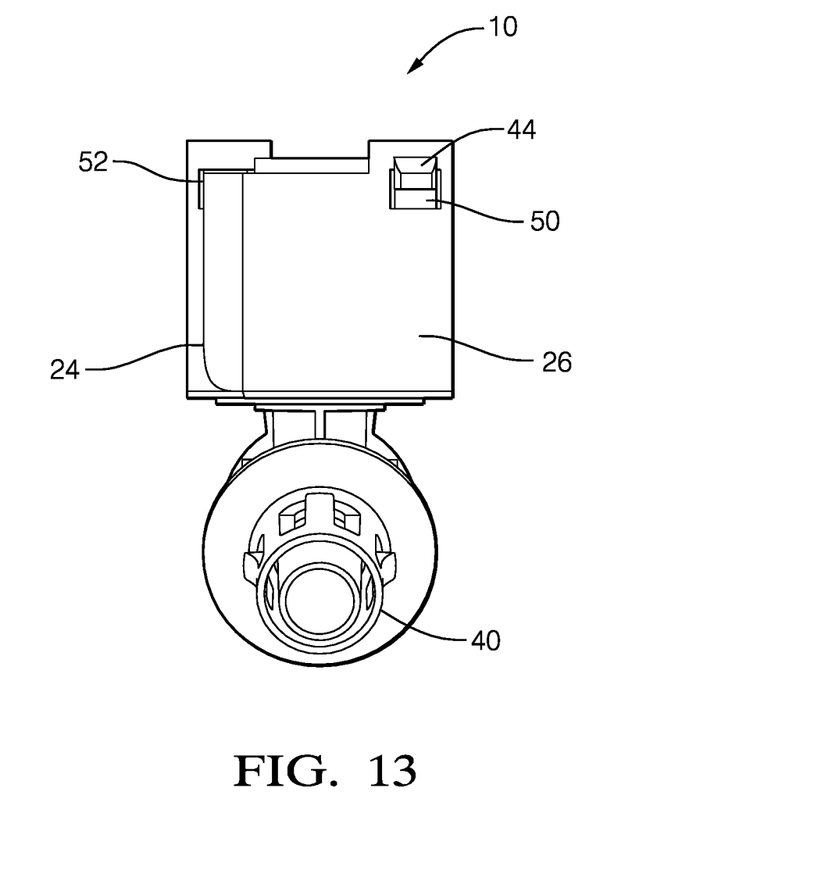
FIG. 13 is a top plan view of the coupler of FIG. 1 with the first and second arms fully closed and the first and second clamps engaging a corrugation of the corrugated tube in accordance with one embodiment.

FIG. 1 illustrates a non-limiting example of a coupler 10 attached to a corrugated tube 12. The coupler 10 is configured to be attached to the end 14 of the corrugated tube 12 having an inside diameter 16 and a plurality of corrugations 18 of alternating smaller outside diameter 20 and larger outside diameter 22. In the illustrated example, the corrugated tubes are non-helical, that is the corrugations 18 are parallel and non-interconnecting. The corrugated tube 12 may be formed of a polyamide (NYLON) or polyethylene material. The coupler 10 includes a first arm 24 and a second arm 26 that are connected to a flange 28 having a width 30 larger than the inside diameter 16 of the corrugated tube 12 that is disposed at the end 14 of the corrugated tube 12. The first and second arms 24, 26 each define a first and second clamp 32, 34 respectively that project generally perpendicularly from the first and second arms 24, 26. As used herein, generally perpendicularly means ±15° from absolutely perpendicular. The first and second arms 24, 26 are attached to the flange 28 by a pair of flexible hinges 36 that allow the first and second arms 24, 26 to swing so that the first and second clamps 32, 34 can capture the corrugated tube 12. Each of the first and second clamps 32, 34 engages a smaller outside diameter 20 portion of the corrugated tube 12. The first and second clamps 32, 34 are configured so that when the first and second arms 24, 26 are closed, the first and second clamps 32, 34 define an opening 38 that is slightly larger than the smaller outside diameter 20 and slightly smaller than the larger outside diameter 22 of the corrugated tube 12, thus trapping an end portion 14 of the corrugated tube 12 between the first and second clamps 32, 34 and the flange 28 and securing the coupler 10 to the corrugated tube 12. The coupler 10 also includes a fitting 40 configured to attach the corrugated tube 12 to another device. In the illustrated example, the fitting 40 is configured to attach the coupling to an air conditioning evaporator in order to drain condensate from the evaporator through the corrugated tube 12. Alternatively, the fitting could be a threaded fitting, a barbed fitting, or a compression fitting.

Cross-referencing FIGS. 1-5, details of a first non-limiting example of the coupler 10 can be seen. FIGS. 2-5 illustrate the coupler 10 with the first and second arms 24, 26 in a completely open position. The coupler 10 includes a hollow shaft 42 that is configured to be inserted into the inside diameter 16 of the corrugated tube 12. The fitting 40 is in fluid communication with the hollow shaft 42. As used herein, fluid communication means that a fluid, such as a liquid or a gas could pass between the fitting 40 and the hollow shaft 42. While the application of the illustrated example is used to drain liquid condensate, the coupler 10 could also be used in other applications that do not require a leak-tight seal between the coupler 10 and the corrugated tube 12. Fluid communication does not necessarily mean that there has to be a flow of a fluid through the coupler 10. For example, the coupler 10 may also be used to connect to corrugated electrical conduit, such as split corrugated wiring loom tube produced by Panduit of Tinley Park, Illinois. In this case, the fitting may be a grommet to protect a wire cable routed within the electrical conduit as is passes through a sheet metal panel As illustrated in FIGS. 10-13, the first clamp 32 includes first releasable locking feature having a first pawl 44 that has a bevel 46 and a bearing surface 48 that is configured to interface with a first aperture 50 defined by the second arm 26. When the bevel 46 engages the first aperture 50 as the first and second arms 24, 26 are closed, the bevel 46 deflects the first clamp 32 until the bevel 46 clears the aperture at which point the first clamp 32 springs back and the bearing surface 48 engages the second arm 26, thereby locking the first clamp 32 to the second arm 26 Likewise, the second clamp 34 includes a second releasable locking feature having a second pawl 52 that has a bevel 46 and a bearing surface 48 configured to interface with a second aperture 54 defined by the first arm 24, thereby locking the second clamp 34 to the first arm 24. These locking features may be released without the use on any specialized tools merely by prying the by first and second arms 24, 26 so that the bearing surfaces 48 no longer engage the first and second arms 24, 26. Alternative embodiments of the coupler may be envisioned with other releasable or non-releasable locking features, e.g. rivets, clips, threaded fasteners, or adhesives.

As illustrated in FIGS. 2-13, the coupler 10 is an integral assembly that is formed of a plastic material, such as polyamide, polyethylene, or polypropylene. The coupler 10 may be formed, for example, using an injection molding process. The flange 28 and first and second arms 24, 26 are substantially rigid structures that are connected by "living hinges" that are thin flexible hinges 36 made from the same material as the flange 28 and first and second arms 24, 26. In alternative embodiments of the coupler, the first and second arms may not be integral to the flange and other types of hinges such as a butt hinge, piano hinge, etc. may be used for the first and second hinges.

The first and second clamps 32, 34 each define a quarter-round portion 56 that is configured to engage at least one of the corrugations 18 of the corrugated tube 12. As used herein, "quarter-round" means that each clamp defines an arc having a measure of between 85° and 95°. The quarter-round portions 56, when assembled, engage approximately half of the circumference of the corrugated tube 12, adequately securing the coupler 10 to the corrugated tube 12, while still allowing the clamps 32, 34 to be swung into position when assembling the coupler 10 to the corrugated tube 12 without interference with the corrugations 18 as may result from a clamp having a half-round portion.

The coupler 10 may include gussets 58 between the arms and the clamps to increase the strength of the clamps. The gussets 58 may also enclose the portion of the corrugated tube 12 clamped to the coupler 10 when the arms of the coupler 10 are fully closed and locked.

In an alternative embodiment, the first arm may be longer than the second arm so that the first clamp engages a different corrugation than the second clamp. This provides the benefit of allowing the coupler to be used with either non-helical or helical corrugated tubes.

In yet another alternative embodiment, the coupler may include two flanges with two sets of arms and clamps so that the coupler could be used as a union to join two corrugated tubes.

Accordingly, a coupler 10 configured to be attached to an end 14 of a corrugated tube 12 is provided. The coupler 10 is an integral assembly that can be injection molded from a plastic material and snapped onto the end 14 of a corrugated tube 12, eliminating the cost and labor associated with a separate clamp from the assembly of a coupler 10 and corrugated tube 12. The coupler 10 delivers the benefit of providing a drain tube assembly that can be made from a standard blow molded corrugated NYLON tube rather than a custom molded drain tube and eliminates the need for a separate metal clamp to attach the coupler to the drain tube. The coupler 10 may be used in a wide variety of applications of corrugated tubes including liquid drain tubes, pneumatic ducts, and electrical conduit.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

I claim:

1. A coupler configured to be attached to an end of a corrugated tube having an inside diameter and a plurality of corrugations of alternating smaller outside diameter and larger outside diameter, comprising:

a hollow shaft configured to be inserted within the corrugated tube;

a flange surrounding at least a portion of the hollow shaft and having a width larger than the inside diameter of the corrugated tube;

a first arm attached to the flange by a first flexible hinge and defining a first clamp configured to engage an outer surface of at least one of the plurality of corrugations when the first arm pivots about the first flexible hinge; and a second arm attached to the flange opposite the first arm by a second flexible hinge and defining a second clamp configured to engage the outer surface of at least one of the plurality of corrugations when the second arm pivots about the second flexible hinge;

wherein the first clamp and the second clamp each have an edge configured to contact the corrugated tube defining an arc having a measurement within a range of 95° through 85°, the edges configured to engage at the outer surface of least one of the plurality of corrugations.

2. The coupler according to claim 1, wherein the first clamp includes a first locking feature configured to lock the first clamp to the second arm and wherein the second clamp includes a second locking feature configured to lock the second clamp to the first arm.

3. The coupler according to claim 1, wherein the first flexible hinge and the second flexible hinge are characterized as living hinges.

4. The coupler according to claim 1, further comprising:

a fitting disposed on a distal end of the hollow shaft and in fluid communication with the hollow shaft.

5. The coupler according to claim 1, wherein the first clamp is generally perpendicular to the first arm and wherein the second clamp is generally perpendicular to the second arm.

6. A tube assembly, comprising:

a corrugated tube having an inside diameter and a plurality of corrugations having an alternating smaller outside diameter and larger outside diameter; and the coupler according to claim 1, wherein the hollow shaft is inserted within the corrugated tube and the first and second clamps engage an outer surface of at least one of the plurality of corrugations.

\* \* \* \* \*